Dec. 11, 1934.     T. W. LORING     1,983,765
FENDER WELL WHEEL LOCK
Filed Aug. 20, 1928

Inventor
Thomas W. Loring
By Blackmore, Spencer & Flinn
Attorneys

Patented Dec. 11, 1934

1,983,765

UNITED STATES PATENT OFFICE 1,983,765

FENDER WELL WHEEL LOCK

Thomas W. Loring, Lansing, Mich., assignor to General Motors Corporation, Detroit, Mich., a corporation of Delaware Application August 20, 1928, Serial No. 300,869

10 Claims. (Cl. 70—90)

This invention relates to spare tire carriers for motor vehicles and more particularly to an improvement in locking devices for preventing theft or unauthorized removal of the extra tire. The invention is especially adapted for use with a fender well type of carrier wherein a pocket is formed in the front fender just forward of the door to the driver's seat, to receive the spare tire which may be carried on a rim or on a demountable wheel such as the conventional disc, spoke or wire wheels now in general use, and which tire is held in the well by an arm engageable with the periphery or tread of the tire opposite to that in the well and detachably carried on a mounting rod extending upwardly from the fender and braced at its upper end from the side of the vehicle body.

Heretofore, the upper tire engaging arm of fender well carriers of this general type has been provided with a lock to prevent its detachment, but it is found that with the aid of a pry bar the arm could be broken off so as to allow the tire to be taken out of the well. The present invention contemplates the provision of a retainer mounted in locked position adjacent the fender well to extend within the inner periphery of the tire and prevent removal of the tire from the well, even though the arm engaging with the top of the tire is removed and which is so arranged as to preclude the use of a pry bar.

The invention will be better understood upon reference to the accompanying drawing, wherein.

Figure 1:
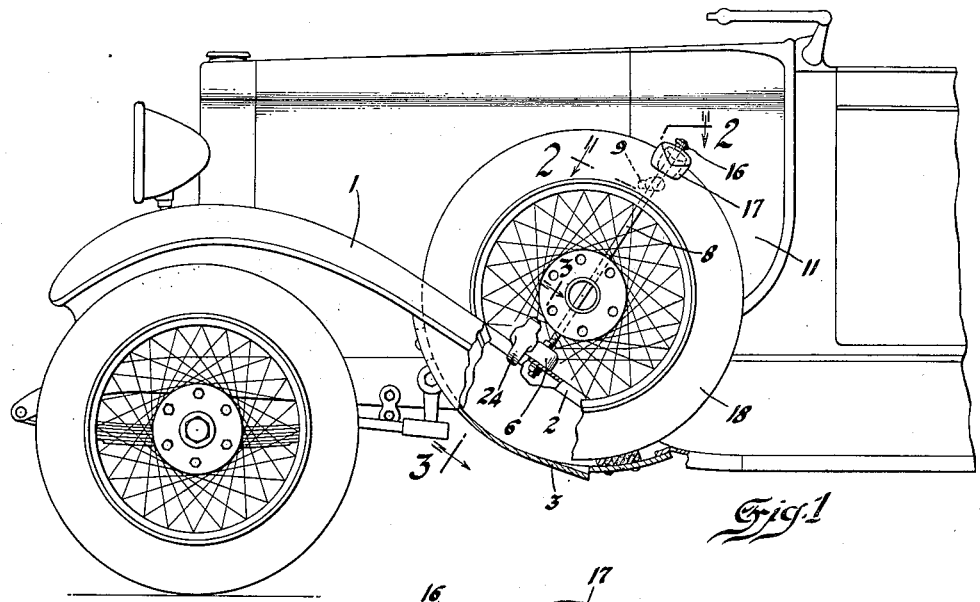
Fig. 1 is a side elevation of the front portion of an automobile with the present invention applied thereto, portions of the fender and tire being broken away to better illustrate the relation of the parts.
Figure 2:
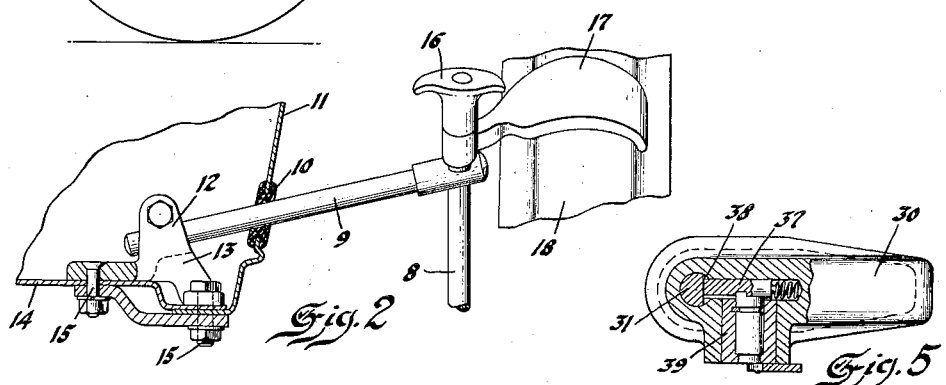
Fig. 2 is a section on line 2—2 of Fig. 1.

While the drawing shows a wire wheel mounted in the carrier, it is to be understood that the invention is equally useable with other types of conventional wheels or rims. As here used the term "tire" may be taken to mean not merely an uninflated tire casing per se, but also the spare tire assembly or complete replaceable unit which includes on present day vehicles either a rim or a wheel in addition to the casing and its inflatable inner tube. The reference character 1 indicates a fender or mud guard over the front wheel having an opening therein bounded by a dependent marginal flange 2, to which is secured as by welding, an arcuate pocket or well 3, preferably stamped from sheet metal. On the inner side of the well, or that side toward the vehicle body, and beneath the fender is an angle reinforcing plate 4 to which is secured as by rivets, 5, a bracket 6. Extending through the bracket and secured by a pair of nuts 7 is an upwardly projecting rod 8, the upper end of which is braced from the body by a rod 9 projecting through a rubber grommet 10 in an opening in the cowl 11 and secured between a pair of split ears 12 of a bracket 13 which is fastened to the dash 14 as by rivets or bolts 15. The upper end of the rod 8 is screw threaded for the detachable engagement of a nut 16 bearing against the tire engaging arm 17 for contact with the upper portion of the tire 18 to firmly clamp the tire in the well 3.

The bracket 6 has a laterally extending portion forming a T-head 19, one leg 20 of which is flat and the other leg down-turned as at 21. A retainer 22 is provided with a hooked arm 23 for engagement beneath the down-turned portion 21 of the bracket and with a dependent arm or lateral foot 24 that extends into the space above the opening of the tire receiving well 3 or within the inside of the tire adjacent to the inner periphery of the rim so as to restrict the well opening and preclude removal of the tire from the well. A latch 25 engages beneath the leg 20 of the T-shaped head 19 and is controlled by suitable lock mechanism contained within the lock barrel 26 in the retainer 22. The insertion and proper manipulation of a key in the lock mechanism will cause the withdrawal of the latch 25 to permit removal of the retainer 22 when the car owner wishes to insert or remove a spare tire. A spring plate 27 may be interposed between the retainer and T-head 19 and held by the rivet 5, to prevent rattle of the parts during use.

Figure 5:
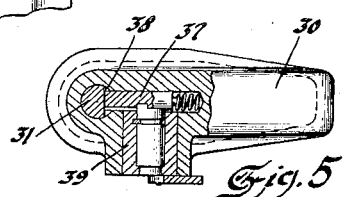
Fig. 5 is a section on line 5—5 of Fig. 4.
Figure 3:
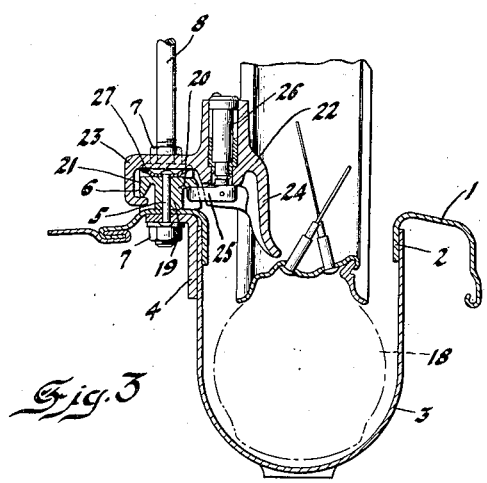
Fig. 3 is a section on line 3—3 of Fig. 1.
Figure 4:
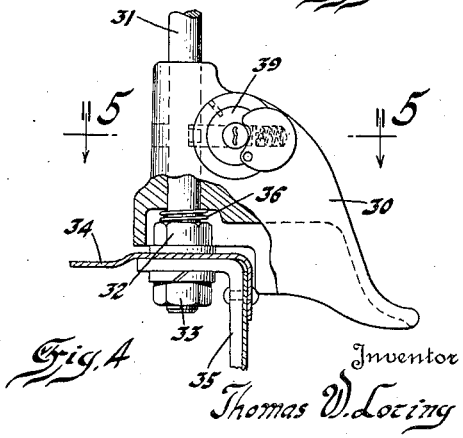
Fig. 4 is a detail view partly in section of a modified form of retainer.

In the modified form shown in Figs. 4 and 5, the retainer element 30 is slidably mounted upon the upwardly extending rod 31 which may also carry the tire engaging arm before described for the top of the tire, and which is secured at its lower end by nuts 32 and 33 to the fender 34 and angled plate 35. After the nut 33 is threaded on the rod, the end of the rod may be riveted or peened over to prevent unthreading of the nut. Between the top of the nut 32 and bottom of the retainer there is preferably provided an anti-rattle element such as the coil spring 36. To hold the retainer against sliding movement on the rod so as to prevent surreptitious removal of the tire, the retainer carries a plunger 37 for engagement in a notch 38 in the rod, which plunger may be retracted from the notch upon the proper operation of the mechanism in the lock barrel 39.

I claim:

1. In a motor vehicle, a fender having a tire receiving well, characterized by a bracket carried by the fender beside the well and having a T-shaped head, a tire retainer detachable from the head and having one arm adapted to extend adjacent the inner periphery of a tire positioned in the well and having a second arm adapted to hook under one leg of the T-shaped head, and a lock controlled latch carried by said retainer and movable under the other leg of said T-shaped head to prevent detachment of the retainer and unauthorized removal of the tire.

2. The structure of claim 1, and resilient means interposed between the head and retainer.

3. In a motor vehicle, a fender having a tire receiving well therein, characterized by a support fixedly carried along one side of the well, a retainer arm engageable with said support and having its free end projecting into the well, and lock mechanism carried by said retainer arm including a movable detent for engagement with the support to prevent unauthorized separation of the retainer arm from its support.

4. In a motor vehicle, a fender having a tire receiving well therein, characterized by a bracket fixedly secured to the fender beyond the inner side of the well, a tire retainer secured to said bracket and having a lateral foot projecting over the inner periphery of the tire adjacent the inner side of the well, and means to lock the retainer on said bracket.

5. In a motor vehicle, a tire receiving well, a bracket fixed at one side of the well, characterized by a tire retainer having a bracket engaging portion and a tire retaining portion, and a lock element carried by said retainer and movable into engagement with said bracket for cooperation with said bracket engaging portion to prevent unauthorized removal of said retainer.

6. In a motor vehicle, a tire receiving well, a bracket fixed at one side of the well, characterized by a tire retainer having at one end a tire retaining portion and at the other end a bracket engaging portion, and a lock controlled detent movably carried intermediate said ends and engageable with said bracket for cooperation with said bracket engaging end portion to prevent unauthorized removal of the tire retainer.

7. In a motor vehicle, a fender having a tire receiving well therein, characterized by a rod secured to the fender adjacent said well, a retainer arm slidable on said rod toward and from the well and adapted to extend within the inner periphery of the tire, and means to lock the arm against sliding movement and in position to lie adjacent the inner periphery of the tire to hold the same against unauthorized removal from the well.

8. In a motor vehicle, the combination with a well for receiving a spare tire assembly, of a rod extending upwardly from the well, a clamping member adjustably associated with the rod to removably hold a tire assembly in the well, a member carried by and extending laterally from the rod to obstruct the removal of the tire assembly from the well, and a lock for preventing unauthorized disengagement of said last mentioned member.

9. In a motor vehicle, the combination with a tire receiving well, of a rod extending upwardly from the well, a tire clamping member adjustably associated with the rod to removably hold the tire in the well, and anti-theft means carried by and extending laterally from the rod for cooperation with the well to prevent unauthorized removal of the tire.

10. In a motor vehicle, the combination with a well for receiving a tire and a rod extending upwardly on one side of the tire, of means to retain the tire in the well comprising a member slidable on the rod and adapted to extend within the inner periphery of the tire and a lock to hold said member against sliding movement on the rod.

THOMAS W. LORING.